United States Patent [19]
Younger

[11] Patent Number: 5,730,685
[45] Date of Patent: Mar. 24, 1998

[54] METHODS AND SYSTEMS FOR IMPROVING THE OPERATION OF TRANSMISSIONS FOR MOTOR VEHICLES

[76] Inventor: Gilbert W. Younger, 2621 Merced Ave., El Monte, Calif. 91733

[21] Appl. No.: 515,098

[22] Filed: Aug. 14, 1995

[51] Int. Cl.$^6$ .................................................. F16H 61/26
[52] U.S. Cl. ......................... 477/156; 475/120; 475/128; 477/130
[58] Field of Search ................................ 475/120, 122, 475/128, 131; 477/127, 130, 156

[56] References Cited

U.S. PATENT DOCUMENTS

| | | | |
|---|---|---|---|
| 3,314,307 | 4/1967 | Egbert | 477/156 |
| 3,491,617 | 1/1970 | Konrad | 477/156 |
| 3,842,693 | 10/1974 | Oberpichler | 475/120 |
| 4,347,765 | 9/1982 | Leonard et al. | 977/156 |
| 4,449,426 | 5/1984 | Younger | 477/127 |
| 4,829,852 | 5/1989 | Sakakiyama | 477/127 |
| 5,540,628 | 7/1996 | Younger | 477/130 |

OTHER PUBLICATIONS

*TRANSGO AOD-HP Reprogramming Kit*, TRANSGO, 1994, pp. 1–6.

*Primary Examiner*—Charles A. Marmor
*Assistant Examiner*—Sherry Lynn Estremsky
*Attorney, Agent, or Firm*—Mark P. Stone

[57] ABSTRACT

Methods and systems for improving the operation of a transmission for an automotive vehicle, and in particular the transmission as installed by the original automobile manufacturer, modify the original hydraulic fluid circuits of the automotive transmission installed by the automobile manufacturer to enable the "factory installed" transmission to hold first gear in the first gear selector position through any rotational speed of the engine. Further modifications to the hydraulic circuitry enable the operator of the vehicle to select fourth gear manually at relatively high vehicle speeds at wide open throttle conditions. Additional modifications to the hydraulic circuitry increase the third clutch capacity at high throttle during a "2–3" shift, and result in firm and more correctly timed shifts. The modifications to the hydraulic circuitry of the "factory installed" transmission provide new valves, block existing hydraulic lines, provide additional connecting hydraulic lines to the existing hydraulic circuitry, increase minimum and maximum main line pressure by changing regulator springs, and enlarge or reduce orifice sizes in the hydraulic circuitry of the "factory installed" transmission to increase or decrease fluid flow.

19 Claims, 8 Drawing Sheets

METHODS AND SYSTEMS FOR IMPROVING THE OPERATION OF TRANSMISSIONS FOR MOTOR VEHICLES

BACKGROUND OF THE INVENTION

A portion of the disclosure of this patent contains material which is subject to copyright protection. The copyright owner has no objection to the facsimile reproduction by anyone of the patent document or patent disclosure as it appears in the Patent & Trademark Office files or records, but otherwise reserves all copyright rights whatsoever.

The methods and systems of the present invention are directed to the modification and improvement of transmissions for automotive vehicles of the type installed by the original equipment manufacturers, commonly referred to as "factory installed" transmissions. The present invention is particularly directed to the improvement and modification of the "AOD" (Automatic Overdrive Transmission) or the "AOD-HP" (Automatic Overdrive Transmission-High Performance) installed in vehicles manufactured by The Ford Motor Company of Dearborn, Mich.

The present inventor owns U.S. Pat. No. 5,253,549, issued Oct. 19, 1993 and entitled "Methods And Systems For Improving The Operation Of Automatic Transmissions For Vehicles"; U.S. Pat. No. 4,790,938, issued on Dec. 13, 1988 and entitled "Filter For Removing Particulate Matter From Fluid Within A Movable Body"; U.S. Pat. No. 4,711,140, issued on Dec. 8, 1987 entitled "Throttle Valve System For Automatic Transmission"; U.S. Pat. No. 4,449,426, issued May 22, 1984 and entitled "Laminated Separator Plate Means For Recalibrating Automatic Transmission"; U.S. patent application Ser. No. 08/333,552, filed Nov. 2, 1994 (now U.S. Pat. No. 5,540,628, issued Jul. 30, 1996) and entitled "Methods And Systems For Improving The Operation Of Transmissions For Motor Vehicles"; and U.S. Ser. No. 08/494,844, filed Jun. 26, 1995 and entitled "Methods And Systems For Improving The Operation Of Transmissions For Motor Vehicles". The basic operation of transmissions for automotive vehicles is discussed in the aforementioned patents and patent applications, and these patents and patent applications are expressly incorporated by reference into the disclosure of the present patent application.

The basic principles of operation of the "factory installed" FORD "AOD" (Automatic Overdrive Transmission) is fully described and illustrated in publication entitled *AUTOMATIC OVERDRIVE TRANSMISSION OPERATION AND DIAGNOSIS*, Dated June 1979, and published by the FORD Motor Company, FORD Parts and Service Division, Training and Publications Department. This publication will hereinafter be referred to as the "FORD Publication", and the disclosure of the FORD Publication in its entirety is expressly incorporated by reference into the disclosure of the present patent application as disclosing and illustrating background material known to those of ordinary skill in the automotive transmission art. More specifically, the disclosure in the FORD Publication of the specific modes of operation of the "AOD" Transmission, including the hydraulic circuits and the interrelationship of hydraulic circuits and components, is expressly incorporated by reference into the present patent application.

The "factory installed" AOD transmission of the FORD Motor Company is only capable of holding the transmission in first gear in the "1" gear selector position trough engine speeds of substantially 4,500 rpm's. Second and third gear can be held to any rpm engine speeds, however, a wide open throttle "3–4" shift was not possible. It is a primary object of the present invention to modify the "factory installed" AOD transmission as illustrated and disclosed in the FORD Publication to enable the AOD transmission to hold first gear in the first gear selector position to any engine speed (and not limited to substantially 4500 rpm), and to enable a "3–4" upshift at relatively high vehicle speeds at wide open throttle conditions.

Further objects of the present invention are to modify the "factory installed" AOD transmission to increase the third clutch capacity at high throttle during a "2–3" shift, and to provide firm and correctly timed shifts.

The objects of the present invention are accomplished by modifying the hydraulic circuitry of the "factory installed" AOD transmission including providing new/replacement valves, blocking existing hydraulic circuit lines; adding new hydraulic circuit lines; replacing existing pressure regulator springs to increase minimum and maximum main line pressure, and enlarging or reducing the size of existing orifices in the "factory installed" transmission to selectively increase or decrease the rate or quantity of hydraulic fluid flow therethrough.

Other objects improvements and advantages of the present invention will become apparent to those skilled in the art from the following description in conjunction with the drawings.

SUMMARY OF THE INVENTION

The present invention provides methods, apparatus and systems for modifying the structure, operation, and functional relationship of structure in "factory installed" transmissions for automotive vehicles. In accordance with the present invention, the "AOD" (Automatic Overdrive Transmission) installed in vehicles manufactured by the FORD Motor company, of Dearborn Mich., is modified to enable the driver of a vehicle to hold first gear manually to any engine rotational speed (not limited to 4500 rpm) when the gear selector is in the "1" first gear selection position. The present invention further provides modifications to the "factory installed" AOD FORD transmission to enable the operator of the vehicle to select fourth gear manually at high vehicle speed at wide open throttle conditions, during a "3–4" upshift; and the transmission is further modified to increase the third clutch capacity at high throttle during a "2–3" upshift. The modifications to the operation of the AOD FORD transmission are accomplished by modifying the hydraulic circuitry of the "factory installed" AOD transmission to adjust the applied fluid pressure including modifications to the direction, quantity and rate of hydraulic fluid flow. The modifications include the replacement of existing valves, the discontinuation of certain "factory installed" flow lines, the addition of new flow lines, the replacement of regulator springs for the purpose of adjusting the range between maximum and minimum main line hydraulic pressure, and enlarging or reducing the size of existing orifices in the "factory installed" hydraulic circuitry of the AOD FORD transmission to increase or decrease the rate and quantity of hydraulic fluid flow through the respective orifices.

Additional the present invention modifies the hydraulic circuitry of the "factory installed" AOD transmission to improve the firmness of the "factory installed" shifts, and to correct the timing of the "factory installed" shifts. The modifications to the AOD transmission in accordance with the present invention are particularly useful in transmissions installed in "high performance" (HP) vehicles, as for example, police vehicles, emergency vehicles, trucks, and four wheel drive vehicles, as well as for improving the performance of the AOD transmission installed in conventional passenger vehicles.

DESCRIPTION OF THE BEST MODES FOR CARRYING OUT THE INVENTION

The present invention is directed to improvements and modifications to existing "factory installed" AOD or AOD-HP transmissions, installed in vehicles manufactured by the FORD Motor Company. The object of the present invention includes modification of the structure, hydraulic circuitry, interrelationship of structure and fluid flow patterns through the hydraulic circuitry, including adjustment of hydraulic fluid flow and applied hydraulic fluid pressure, for improving the operation of the "factory installed" transmission. As will be discussed, the modifications to the "factory installed" hydraulic circuitry of the AOD transmission result in the ability of the transmission: to hold first gear manually to any rpm engine speed (and not limited to any engine speeds exceeding 4500 rpm); to enable the operator of the vehicle to select 4th gear manually at relatively high vehicle speeds at wide open throttle; to increase the third clutch capacity at high throttle during a "2–3" shift; and to provide firmer and more correctly timed shifts than provided by the "factory installed" AOD transmission. These results are accomplished by replacement of "factory installed" valves, replacement of "factory installed" regulator springs to adjust maximum and minimum main line hydraulic pressure; adding fluid flow lines not present in the "factory installed" hydraulic circuitry of the AOD transmission; discontinuing fluid flow lines present in the "factory installed" AOD transmission; and increasing and decreasing the size of orifices in the hydraulic circuitry of the "factory installed" AOD transmission for increasing and decreasing the rate and quantity of hydraulic fluid flow through the "factory installed" orifices.

As previously noted, the disclosure of the FORD Publication (Automatic Overdrive Transmission) Operation And Diagnosis, Jun. 19, 1979) is expressly incorporated by reference into the present patent application.

Figure 1A:
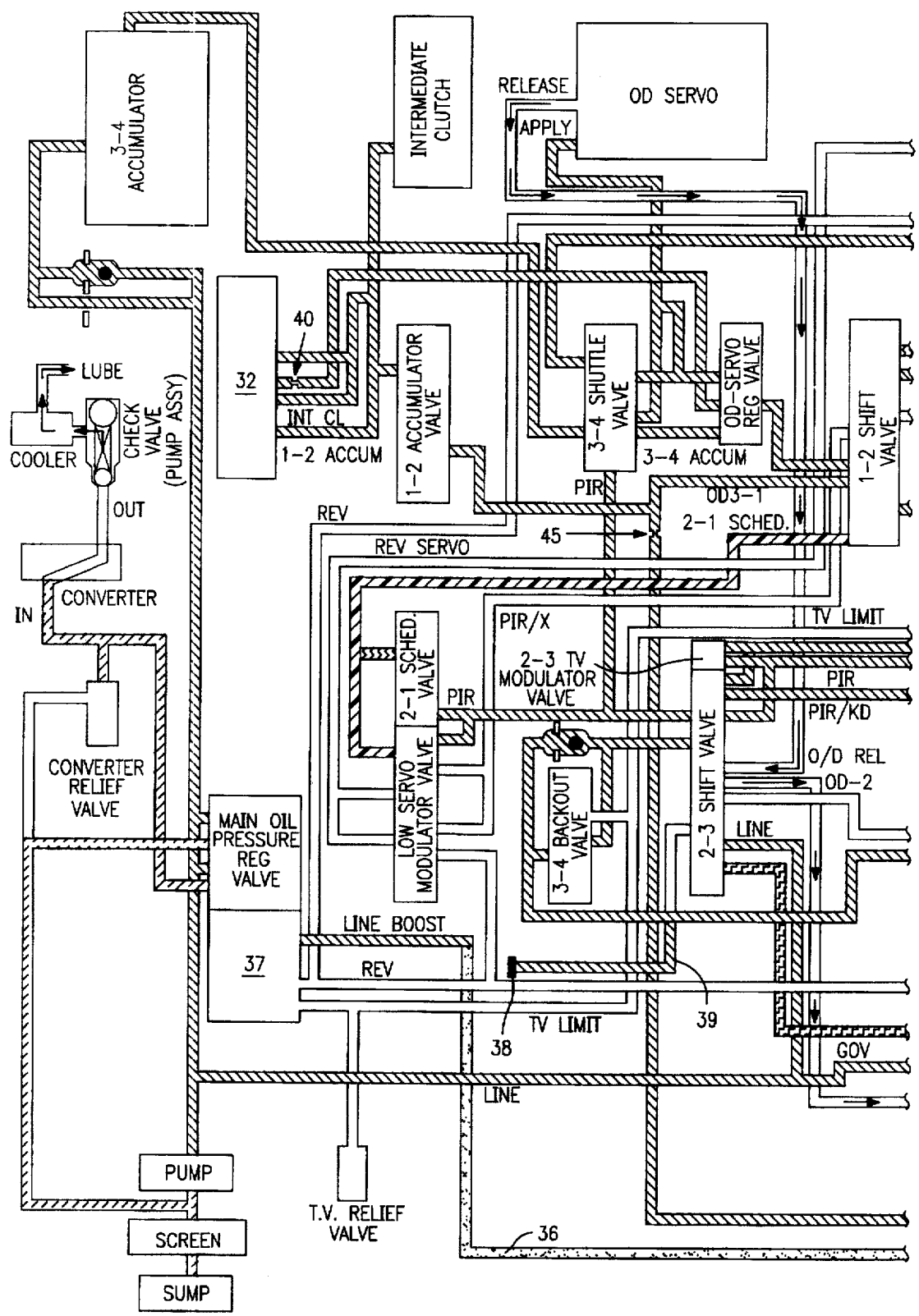
FIG. 1 illustrates the hydraulic circuitry and operation thereof of the "factory installed" AOD FORD transmission when second gear is in manual low range, as modified in accordance with the present invention.
Figure 1B:
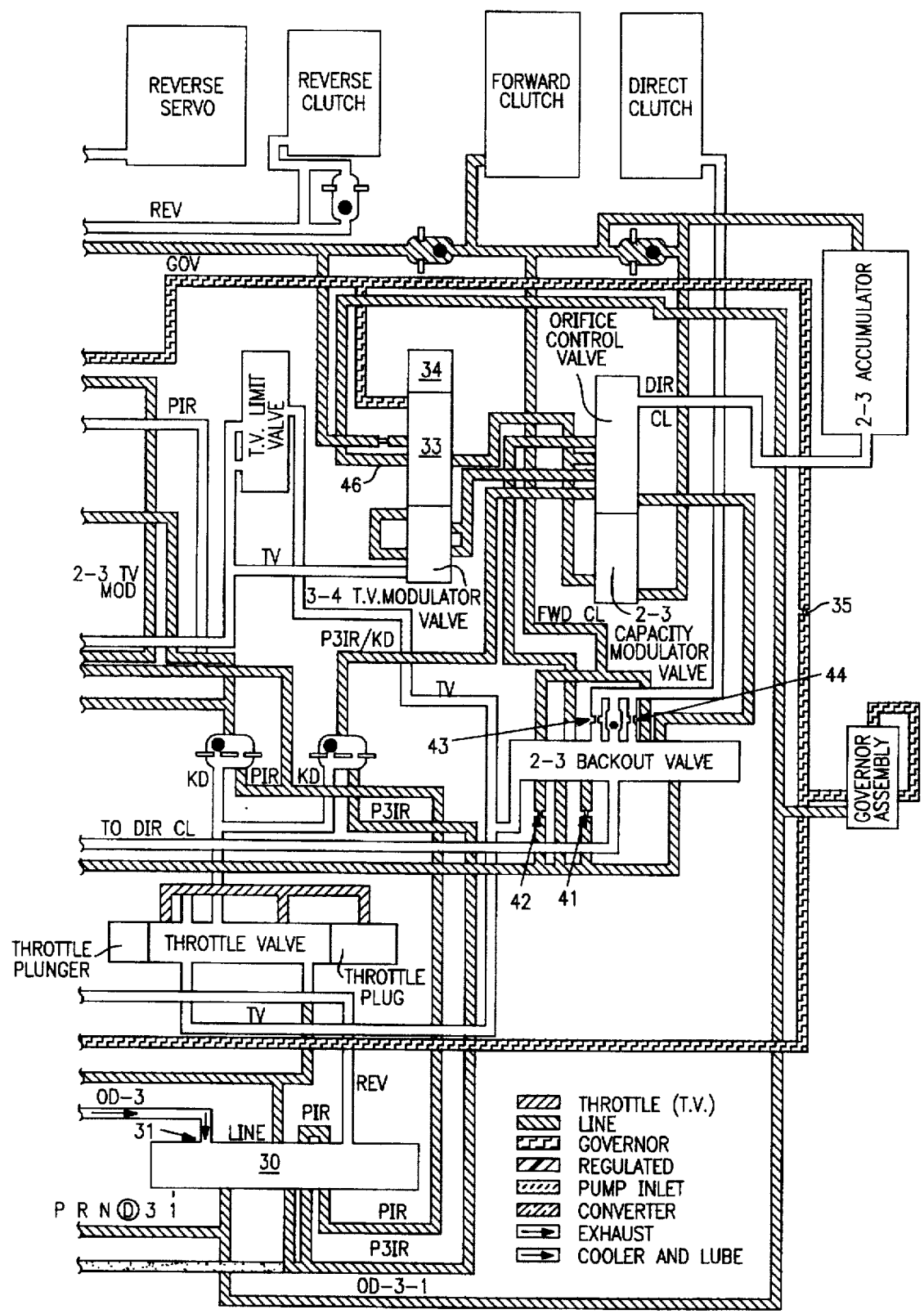
Figure 2A:
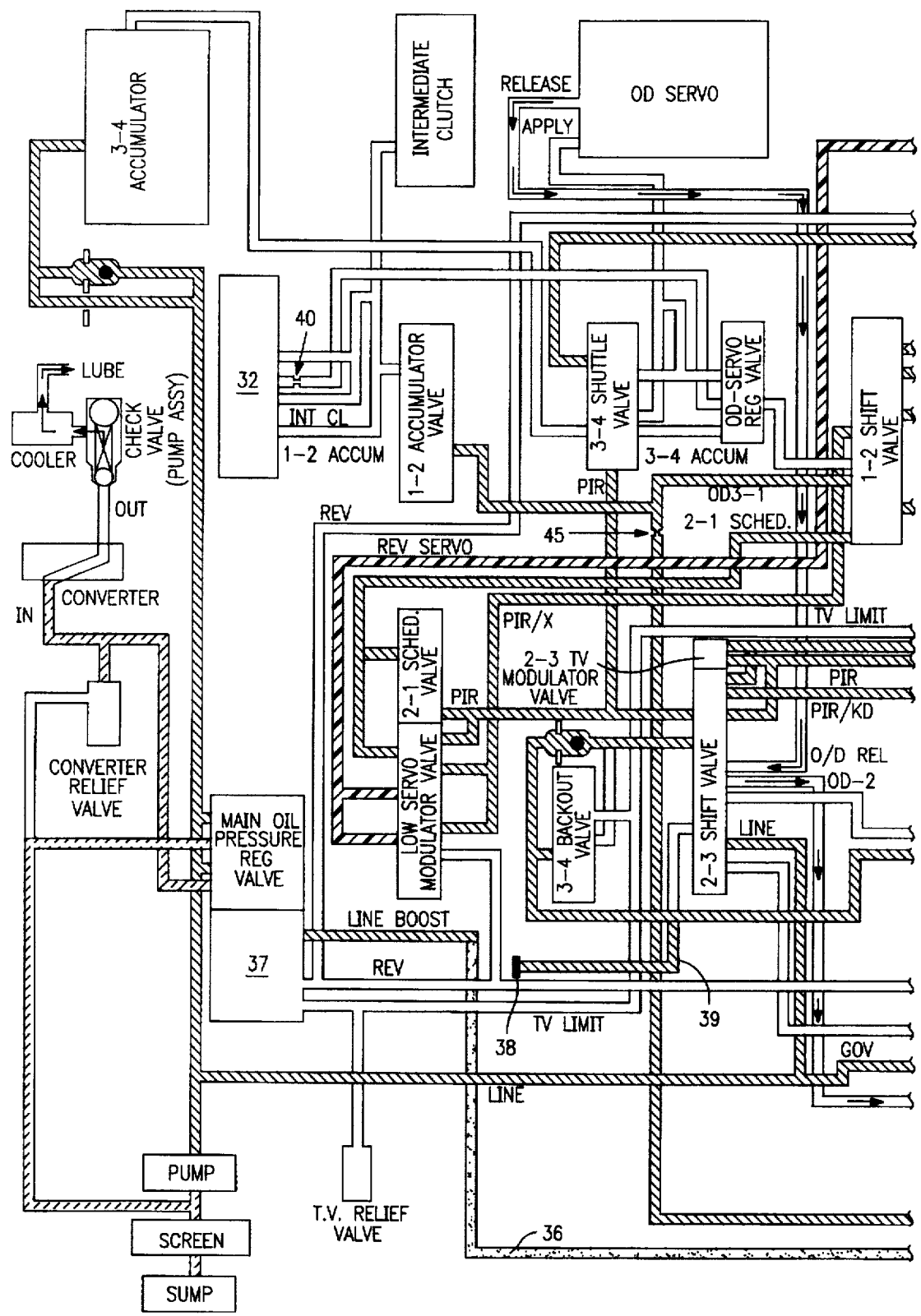
FIG. 2 illustrates the hydraulic circuitry and operation thereof of the "factory installed" AOD FORD transmission in manual low (range 1, first gear), as modified in accordance with the present invention.
Figure 2B:
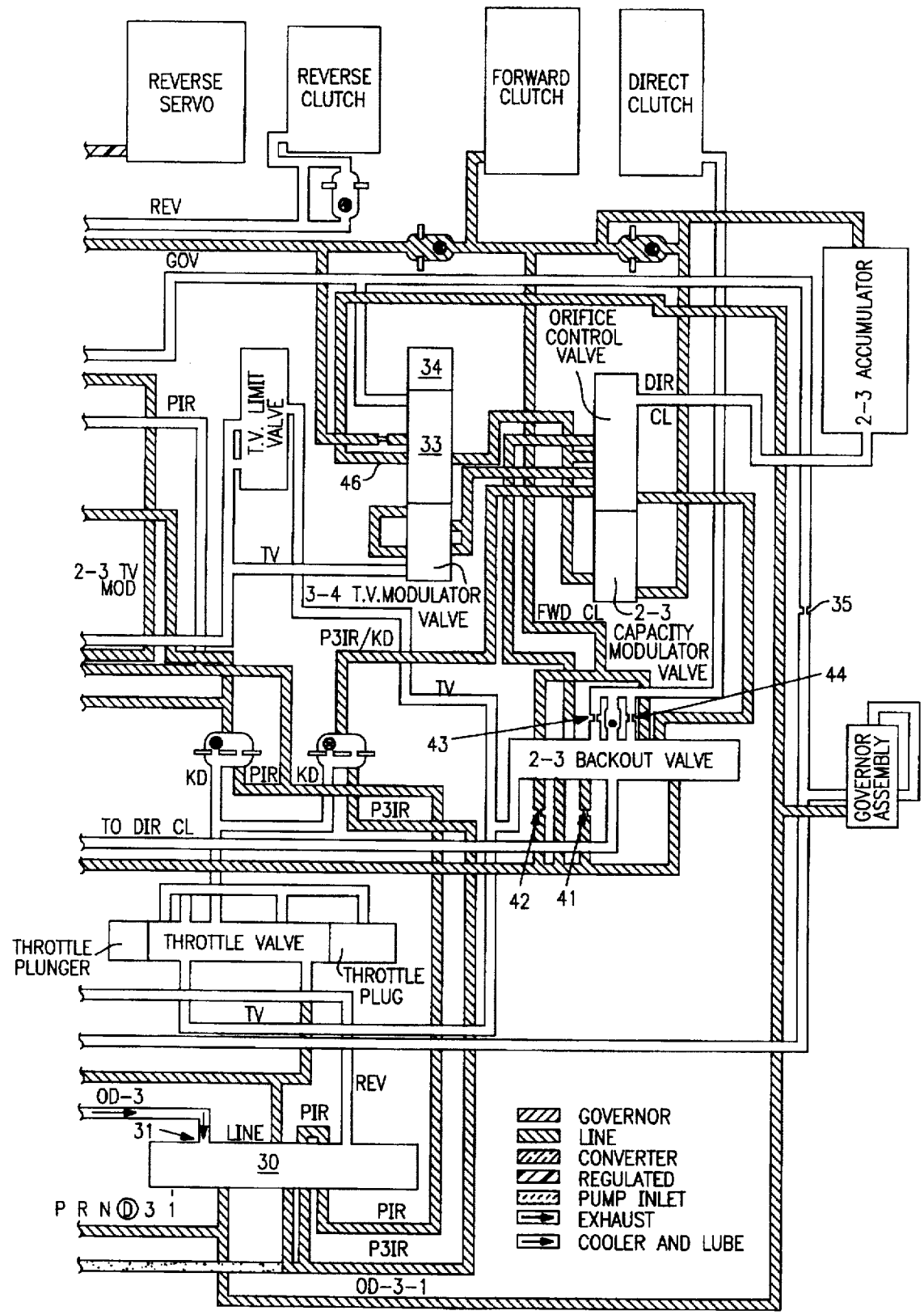
Figure 3A:
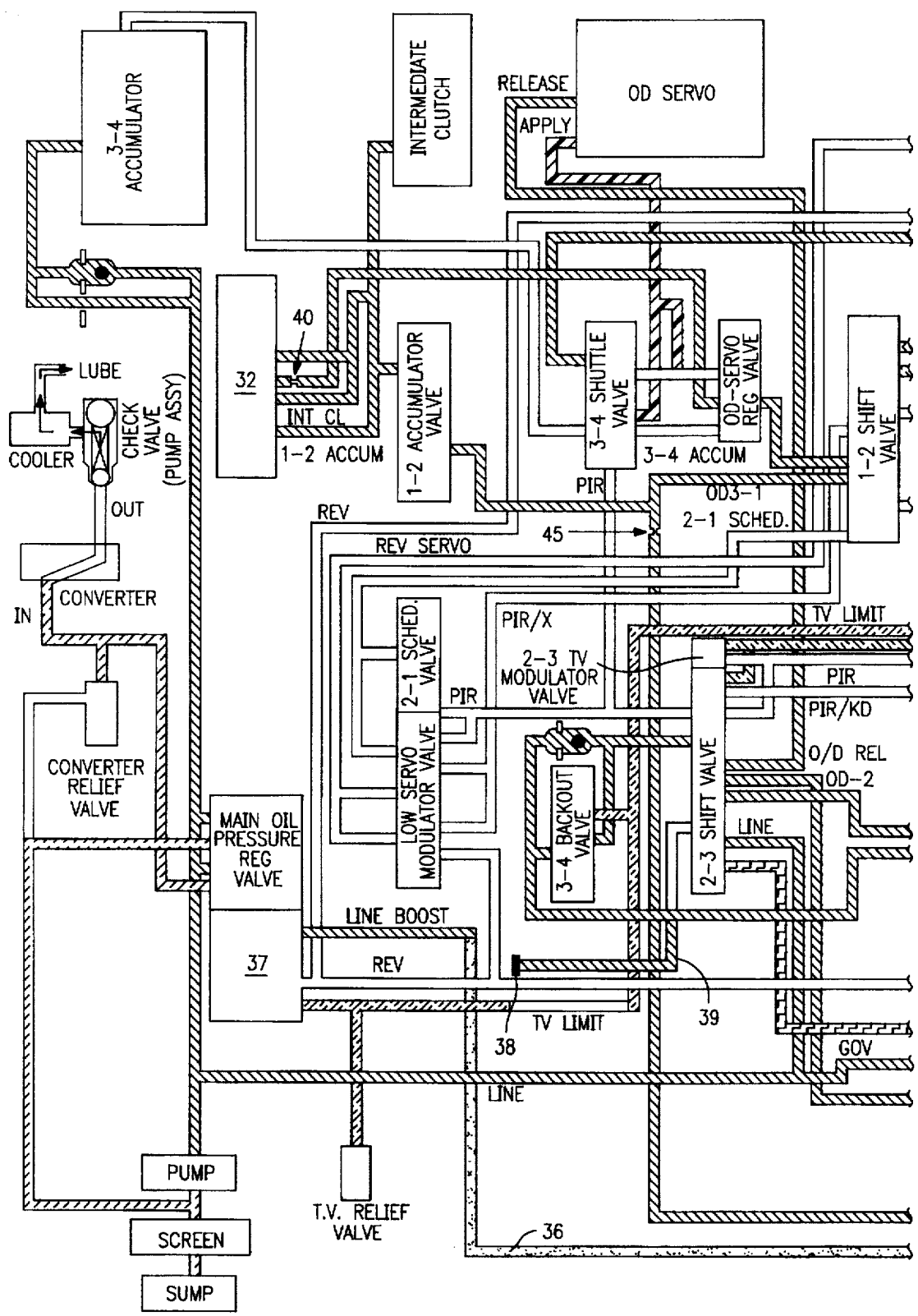
FIG. 3 illustrates the hydraulic circuitry and operation thereof of the "factory installed" AOD FORD transmission in 3rd gear in range 3 (overdrive lockout), as modified in accordance with the present invention.
Figure 3B:
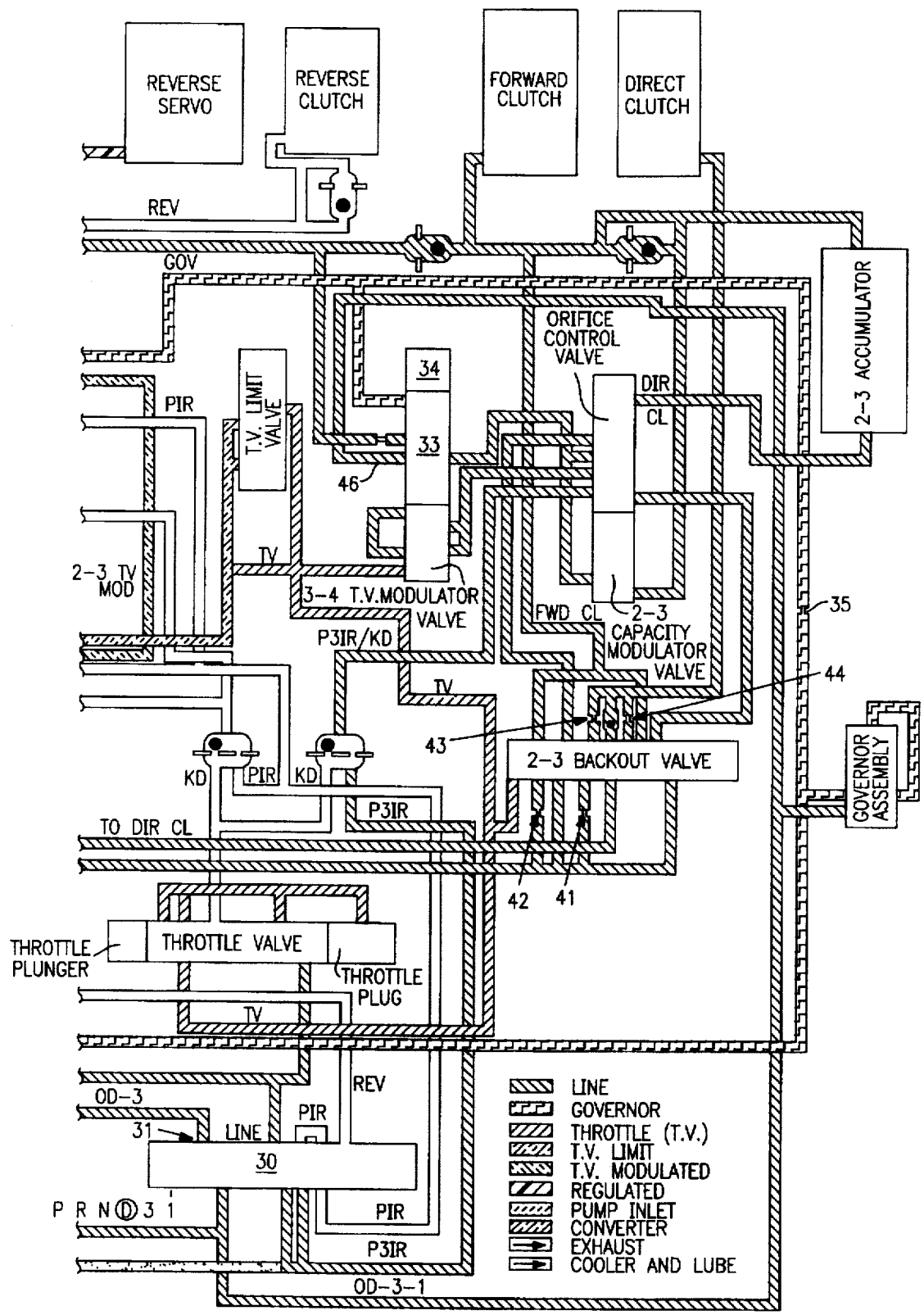
Figure 4A:
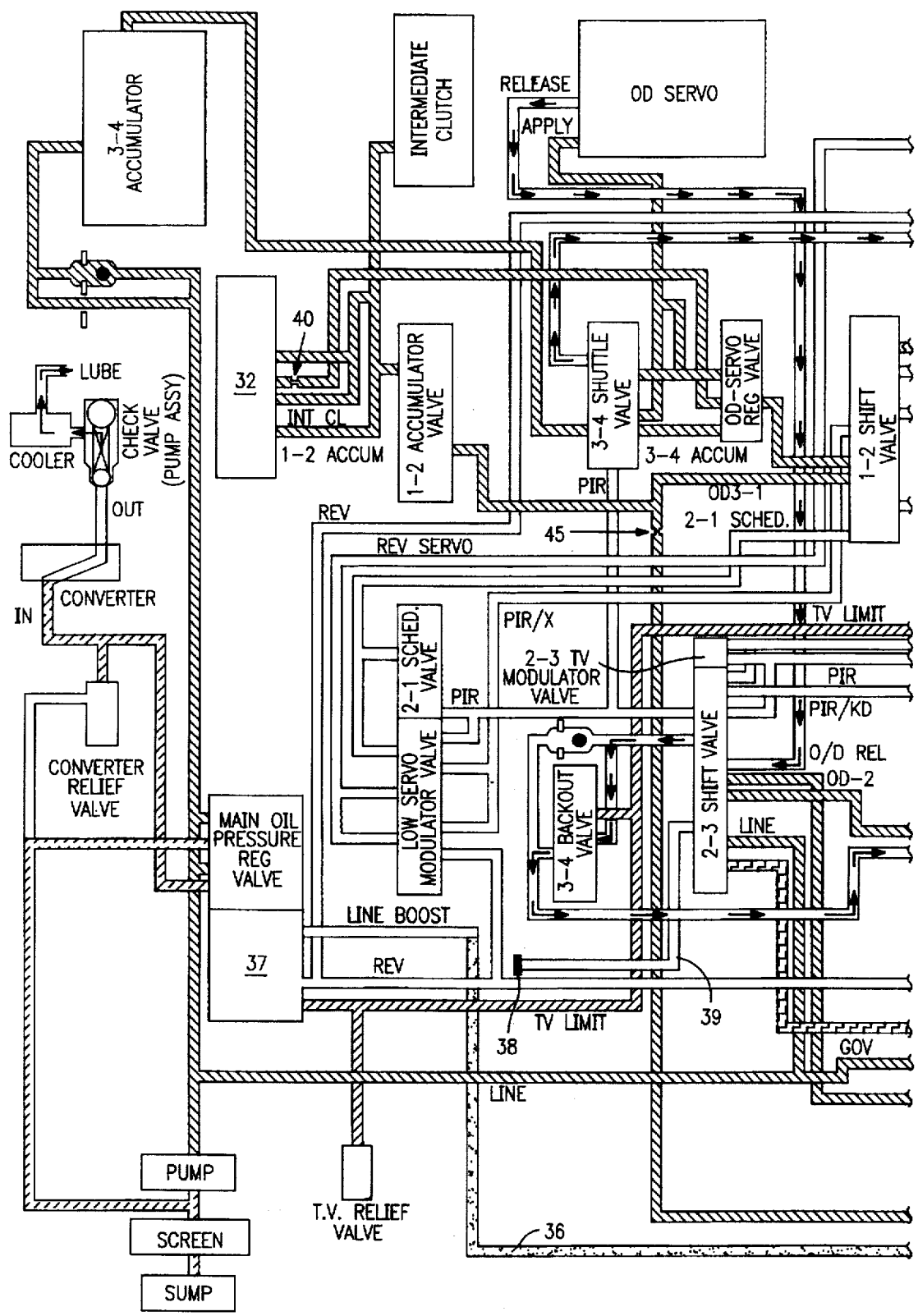
FIG. 4 illustrates the hydraulic circuitry for the "factory installed" AOD FORD transmission in overdrive (4th gear), as modified in accordance with the present invention.
Figure 4B:
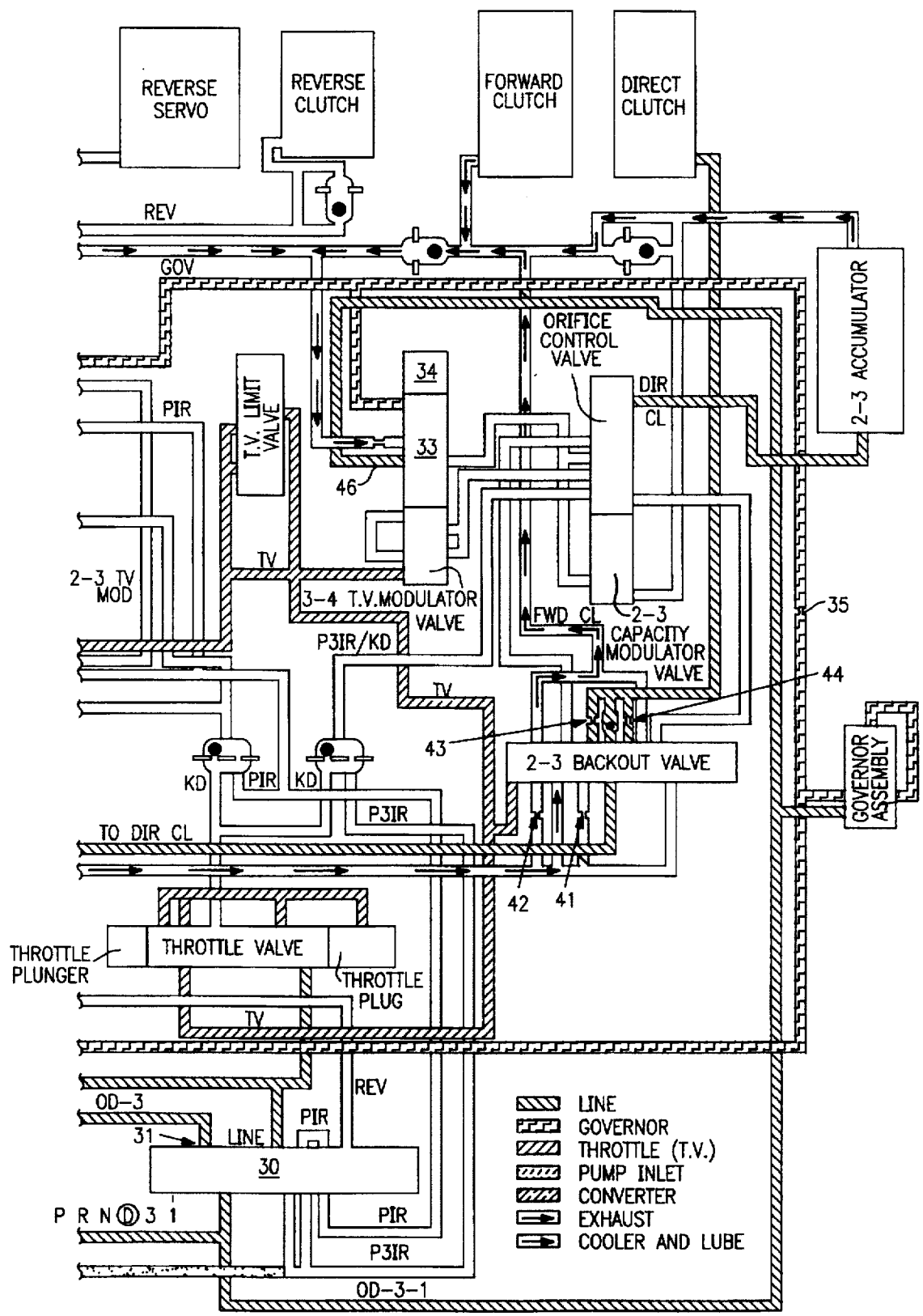

FIGS. 1–4 of the drawing illustrate they hydraulic circuits of the "factory installed" AOD transmission, as illustrated and disclosed in the FORD Publication at pages 88–89; pages 74–75; at pages 82–83; and at pages 84–85, as modified in accordance with the present invention.

The "factory installed" AOD transmission is disclosed at pages 88–89 of the FORD Publication. This disclosure illustrates the "factory installed" hydraulic system at closed throttle in low manual second gear. Description of the structure and operation is made with respect to the reference numerals designated at the aforementioned pages of the FORD Publication by which numerals 1–3 illustrate the main control pressure system, numerals 4–5 illustrate the T.V. system; numeral 6 illustrates the forward clutch system, numerals 7–9 illustrate the governor and shift valves, numerals 10–13 illustrate the OD servo apply, and numerals 14–15 illustrate "2–1" scheduling pressure. Reference numeral 1 illustrates the main regulator valve controlling line pressure and supplying the converter, cooler and lube systems; reference number 2 illustrates line boost pressure effective to increase control pressure since the "2–3" shift valve is "downshifted"; and reference numeral 3 illustrates passages P-1-R, P-3-1-R an OD-3-1 which are charged at the manual valve. The REV and OD-3 passages are exhausted. Reference numeral 4 illustrates that the T.V. is exhausted at closed throttle, and reference numeral 5 illustrates that both "back-out valves" are in the spring-loaded "in" position. Reference number 6 illustrates that the forward clutch remains applied, and pressure is through the OD-3-1 passage, the 3–4 shift valve, the orifice control valve, the 2–3 backout valve, and the A orifice. Reference numeral 7 illustrates the pressure output being sufficiently high to hold the "1–2" shift valve in the upshifted (inward) position; Reference numeral 8 illustrates the OD-3-1 line pressure which is available to hold the intermediate clutch applied; and Reference numeral 9 illustrates the "2–3" and "3–4" shift valves forced to the downshifted (outward) position by line pressure on the spring end, as well as on the differential areas. Reference numeral 10 illustrates the "3–4" shuttle valves held out by P-1-R pressure assisting the spring; Reference numeral 11 illustrates pressure in the "3–4" ACCUM Passage effective through a drilled hole in he OD servo regulator valve, which is held inward and cannot regulate; Reference numeral 12 illustrates the release side of the servo exhausted through the "2–3" shift valve and the OD-3 passage (to the manual valve); and Reference numeral 13 illustrated line pressure on the apply side of the OD servo piston which can now apply the OD band. Reference numeral 14 illustrates the "2–1" scheduling valve regulating the "2–1" SCHEDULING pressure from the "P-1-R" passage; and Reference numeral 15 illustrates regulated pressure effective to the spring end of the "1–2" shift valve, which will assist line pressure at two differential areas to force the valve to downshift as governor pressure is reduced at lower road speed.

Referring to the illustration and description of the "factory installed" transmission discussed at pages 74–75 of the FORD Publication, Reference numerals 1–3 illustrate the main control and converter systems; Reference numeral 4 illustrates the T.V. system; Reference numerals 5–6 illustrate the exhausted passages; Reference numerals 7–12 illustrate the forward clutch and governor; Reference numerals 13–15 illustrate the lo reverse servo apply; and Reference numerals 16–22 illustrate upshift lockout. More specifically, reference numeral 1 illustrates the main control pressure system regulating pressure of the fluid from the pump, in which fluid is flowing from the regulator valve throught the converter, the cooler and lube circuits. Reference numeral 2 illustrates the "3–4" accumulator moved upwardly by line pressure under the piston, and reference numeral 3 illustrates line boost pressure causing line pressure to increase because the "2–3" shift valve is outward. Reference numeral 4 illustrates T.V. pressure exhausted (as in the neutral closed throttle), and thus there is no T.V. pressure in the system illustrated by FIG. 2. Reference numeral 5 illustrated that the REV passage is exhausted at the manual valve, and therefore the lo servo modulator valve cannot provide full line pressure to apply the low-reverse servo, and reference numeral 6 illustrates the OD-3 passage which is also exhausted at the manual valve so that there is no release pressure on the overdrive servo. Reference numeral 7 illustrates the OD-3-1 passage from the manual valve charging the forward clutch and governor system; Reference numeral 8 illustrates that there is no governor output until the vehicle begins to move; Reference numeral 9 illustrates that pressure continues through the "3–4" shift valve and orifice control valve, and then through the A orifice to the FWD CL passage; Reference numeral 10 illustrates that the FWD CL passage pressurizes and applies the forward clutch; Reference numeral 11 illustrates the forward clutch apply pressure forcing the "2–3" accumulator down, thereby cushioning the engagement; and Reference numeral 12 illustrates the OD-3-1 pressure which is effective on the "1–2" accumulator valve forcing it outward. Reference numeral 13 illustrates the P-1-R passage charging the P-1-R/X passage through the "1–2" shift valve, thereby providing line pressure to the low servo modulator valve; Reference numeral 14 illustrates the low servo modulator valve operating as a regulator valve because the REV passage is exhausted; and Reference numeral 15 illustrates regulated pressure applied to the low-reverse servo through the REV SERVO passage. Reference numerals 16–22 illustrate the upshift lockout in which the "1–2" shift valve is prevented from moving in by line pressure in the "2–1" SCHED passage on the spring end of the valve (reference numeral 16); Line pressure applied to differential areas between lands (reference numeral 17); and line pressure in the "2–3" T.V. MOD passage applied to a differential area between lands (reference numeral 18). A "1–3" shift is prevented by pressures on the "2–3" shift valve by P-1-R line pressure on the spring end in differential areas (reference numeral 19), and pressure in the line passage acting on a differential area (reference numeral 20). A "1–4" shift is prevented by pressures on the "3–4" shift valve by line pressure effective at the spring end of the valve (reference numeral 21), and OD-D-1 line pressure acting on a differential area between lands (reference numeral 22).

The "factory installed" AOD transmission is also disclosed and illustrated at pages 82–83 of the FORD Publication. Reference numerals 1–4 illustrate the main control pressure system; References numerals 5–7 illustrate the T.V. systems; Reference numerals 8–10 illustrate the OD-3-1 passages; Reference numerals 11–16 illustrate the "2–3" upshift; and reference numerals 17–18 illustrate the overdrive lockout. Reference numeral 1 illustrates high output volume from the pump being controlled by the regulator valve, in which the converter, the cooler and the lube systems receive a constant flow of fluid from the regulator valve; Reference numeral 2 illustrates the "3–4" accumulator forced up; Reference numeral 3 illustrates the T.V. limit pressure increasing line pressure as required by the engine load (LINE BOOST is exhausted); and Reference numeral 4 illustrates the OD-3, the P-3-1-R and OD-3-1 passages charged at the manual valve with line pressure (P-1-R and REV passages are exhausted). Reference numeral 5 illustrates the throttle valve producing a high T.V. pressure, and the "2–3" backout valve is outward; Reference numeral 6 illustrates the "3–4" T.V. modulator valve being held inward and the "3–4" shift valve being held outward by line pressure coming through the orifice control valve coming through the P-3-1-R circuit; and Reference numeral 7 illustrates the T.V. limit valve regulating T.V. limit pressure at about 85 psi. The T.V. limit pressure moves the "3–4" backout valve out and causes the "2–3" T.V. modulator valve to regulate. Pressure in the OD-3-1 passages functions the same as in second gear. Reference numeral 8 illustrates that line pressure is available to the governor, and regulates the governor pressure in response to road speed; Reference numeral 9 illustrates the forward clutch applied, and the top of the "2–3" accumulator is pressurized; an Reference numeral 10 illustrates the OD servo regulator valve regulating apply pressure to the servo, and line pressure is applying the intermediate clutch. The "2–3" upshift is caused by the governor pressure moving the "2–3" shift valve inward. Reference numeral 11 illustrates that OD REL is now pressurized from the forward clutch apply system instead of the OD-3 passage; Reference numeral 12 illustrates the OD-3 passage pressurizing the DIR CL: passage; Reference numeral 13 illustrates direct clutch apply pressure routed through the orifice K; Reference numeral 14 illustrates that the clutch is applied from the DIR CL passage; Reference numeral 15 illustrates the DIR CL pressure has moved the "2–3" accumulator up to cushion the shift; and Reference numeral 16 illustrates fluid above the accumulator seated check valve 2 which has flowed past the "2–3" capacity modulator valve, the valve being operated in regulation during the shift to control the accumulator backpressure, the shift being completed and the valve being returned to its normal "in" position. Reference numeral 17 illustrates overdrive lockout through the P-3-1-R passage at the manual valve and through the shuttle valve number 4 to the P-3-1-R/KD passage (With the orifice control valve in as shown in the drawing, the pressure continues to the bore between the 3–4 shift valve and the "3–4" T.V. modulator valve); and Reference numeral 18 illustrates line pressure effective on the spring end of the 3–4 shift valve to present an upshift to overdrive, and that the line pressure also forces the "3–4" T.V. modulator valve to its normal (in) position.

The "factory installed" AOD transmission is also disclosed and illustrated at pages 84–85 of the FORD Publication. Reference numerals 1–3 illustrate main control and converter systems; Reference numeral 4 illustrates T.V. systems; Reference numerals 5–7 illustrate forward clutch and governor system; Reference numerals 8–14 illustrate "3–4" upshift; and Reference numerals 15–16 illustrate direct and intermediate clutches. Reference numeral 1 illustrates the main control pressure valve regulating line pressure and feeding the converter and lube system; Reference numeral 2 illustrates line pressure applied to the "3–4" accumulator piston; and Reference numeral 3 illustrates the OD-3 and the OD-3-1 passages charged at the manual valve, thereby supplying pressure to the governor and the OD servo regulator valve. Reference numeral 4 illustrates the throttle valve regulating a moderate T.V. pressure, (approximately 30 p.s.i), and the "2—3" and the "3–4" backout valves forced outwardly by the T.V. and T.V. limit pressure. Reference numeral 5 illustrates the governor regulating at high pressure due to high road speed; Reference numeral 6 illustrates governor pressure forcing the "3–4" shift valve inward; and Reference numeral 7 illustrates that the pressure apply passage for the forward clutch is blocked at the "3–4" shift valve. It is noted that the OD servo release and front clutch apply passages are tied together by the backout valves and the "2–3" shift valves, which explains how the upshift has occurred. Reference numeral 8 illustrates that the "3–4" shift valve has opened the forward clutch apply system to an exhaust passage; reference numeral 9 illustrates the forward clutch exhaused together with the top of the "2–3" accumulator; Reference numeral 10 illustrates the OD servo release pressure exhausted through the "2–3" shift valve, the "3–4"

backout valve, and the "2–4" backout valve; Reference numeral 11 illustrates pressure at the end of the "3–4" shuttle valve which is exhausted, and the valve has moved out; Reference numeral 12 illustrates OD-3-1 pressure effective at the inner end of the OD servo regulator valve, in which the pressure through a drilled hole in the servo regulator valve, also acts on the outer end of the valve and moves it inward, causing the valve to stop regulating and to transmit line pressure; Reference numeral 13 illustrates full line pressure applied to the servo apply side through orifice D; and Reference numeral 14 illustrates servo apply pressure also effective above the "3–4" accumulator which has moved down to cushion the "3–4" upshift. Reference numeral 15 illustrates that the direct clutch remains applied from the "2–3" shift valve through the DIR CL passages; and Reference numeral 16 illustrates that the intermediate clutch also remains applied, but is inactive.

FIGS. 1–4, which generally correspond to the drawings and disclosure of the FORD Publication discussed above, illustrate the modifications and improvements to the AOD FORD transmission in accordance with the present invention. The "factory installed" AOD transmission is only capable of holding the transmission in first gear in the first gear selector position through an engine speed of about 4500 rpm. Although second and third gear can be held at any engine speed, a wide open throttle "3–4" shift is not possible with the "factory installed" AOD transmission. The modifications to the hydraulic circuitry of this transmission, as illustrated by FIGS. 1, 2, 3 and 4, improve the performance of the operation of the transmission by enabling the transmission to hold first gear in the first gear selector position for any engine speed (and not limited it to 4500 rpm), and enable a "3–4"upshift to occur at relatively high vehicle speeds at wide open throttle. Moreover, the modifications to the hydraulic circuitry increase the third clutch capacity during a "2–3" shift, which insures the preventing/reducing band/clutch burnup, and the modifications to the hydraulic circuitry further improve the performance of the AOD "factory installed" transmission by creating firmer and more correctly timed shifts.

Referring to FIGS. 1, 2, 3, and 4, the "factory installed" AOD transmission is modified to hold first gear in the first gear selector position to any engine speed by increasing maximum line pressure with new inner and out pressure regulator springs. The replacement pressure regulator springs are provided to increase the minimum and maximum main line pressure of the hydraulic system, as will be understood by those skilled in the relevant art. No modification to the hydraulic system is necessary to manually hold second gear. When the engine reaches the desired rotational speed in first gear (i.e., when the gear selector lever is in the first position), the gear selector is move from the 1 position to the 3rd position, and as the 1–2 shift begins, the gear selector lever is moved back to the 1 position to hold 2nd gear. For 3rd gear, the gear selector lever is moved from the 1 position back to the 3rd position, and the transmission shifts to 3rd gear (which corresponds to the operation of the "factory installed" AOD transmission). Modifications to the hydraulic circuitry of the "factory installed" AOD transmission to attain a "3–4" upshift when the gear selector lever is in the "D" (drive) position at wide open throttle condition will be discussed further below.

One of the improvements to the "factory installed" AOD transmissions provided by the present invention enables the transmission to be manually shifted to 2nd gear without damaging the 4th (OD) band. Referring to the drawing illustrated at page 88 of the FORD Publication, it is noted that the OD servo applies the 4th (OD) band when the gear selector lever is in the "1" position and the transmission is in 2nd gear. However, the OD servo is not applied in 1st gear in manual low. See FIG. 2 of the drawing. In accordance with the modifications provided by the present invention, and with particular reference to FIGS. 1 and 2, a new manual valve, designated by reference numeral 30, including a new added land position, has been added to the "factory installed" AOD transmission. Other than in the new added land position, the new manual valve functions in the same manner as the "factory installed" manual valve. In accordance with the improvements provided by the present invention, when manually upshifting to 2nd gear, the 4th gear OD band tends to apply before the intermediate clutch stops the rotating reverse clutch drum (i.e., drum OD band wraps around), causing the OD band to overheat. The new manual valve 30, including the added land position, is provided to slow down the apply rate of the OD band during a manual upshift to 2nd gear. During a manual "1– 2" shift, the added land on the new manual valve 30 is positioned at the exhaust passage that connects to the release side of the OD servo. The exhaust passage is restricted by a point 0.042 inch orifice that is cross drilled in the manual valve 30 through the added land. In this manner, the pressure drop on the release side of the servo is delayed, thereby decreasing the apply rate of the OD band. See reference numeral 31 of FIGS. 1 and 2 generally designating the orifice drilled into the new manual valve through the added land.

A further modification to the "factory installed" AOD transmission to enable the transmission to hold 1st gear in the 1st gear selector position at any engine speed includes the replacement of the "factory installed" capacity valve with a modified capacity valve to provide a finer "1–2" shift calibration. The new capacity valve is designated by reference numeral 32 in FIGS. 1, 2, 3 and 4 of the drawing. The new capacity valve 32 is machined with multiple narrow lands to reduce valve sticking, and the spring bore is defined deeper than the bore on the "factory installed" capacity valve to accommodate a low rate spring design. The new capacity valve 32 is machined to fit the valve body of the transmission with a small difference in diameter between the bore and the valve. The differential in diameter between the bore and the valve defines an orifice or annular opening between the valve and the bore for purposes of stabilizing the regulating activity of the capacity valve 32.

In accordance with a further object of the present invention, the hydraulic system of the "factory installed" AOD transmission is modified to enable the operator of the vehicle to select 4th gear manually at relatively high vehicle speeds at wide open throttle condition. To provide for a wide open throttle "3–4" shift (i.e., upshift to 4th gear) at relatively high vehicle speeds, a new "3–4" shift valve is installed into the "factory installed" AOD transmission to replace the "factory installed" 3–4 "shift valve". The new "3–4" shift valve is designated as reference numeral 33 on FIGS. 1, 2, 3 and 4 of the drawing. The "3–4" shift valve in accordance with the improvements of the present invention includes a larger diameter land substantially 0.620 inches) on the governor pressure end of the valve, for permitting the valve to upshift with less applied governor pressure that the "3–4" shift valve of the "factory installed" transmission. Since governor pressure tends to reach line pressure at higher vehicle speeds, it is necessary to limit the governor pressure to substantially 140 pounds per square inch (psi) to prevent the transmission from upshifting to 4th gear in the 3rd gear selector position as a result of the increase in diameter of the larger land of the new replacement "3–" shift valve 33. Limitation of the governor pressure is accomplished by providing the new governor end plug replacing the "factory installed" governor end plug. The replacement governor plug includes a pressure limiting spring and ball therein calibrated to limit the governor pressure to 140 psi. See, the governor limit valve designated by reference numeral 34 on FIGS. 1, 2, 3, and 4 of the drawing. Additionally, an orifice of substantially 0.086 inch diameter is defined on the signal side of the governor to reduce the volume of governor pressure that the governor limit valve 34 is required to exhaust. The governor orifice is designated by reference numeral 35 on FIGS. 1, 2, 3 and 4 of the drawing.

In operation, when the gear selector lever is moved into the D position, the spring end of the "3–4" shift valve 33 senses a drop in pressure from line to T.V. pressure. See FIG. 4 of the drawing. The throttle valve (T.V.) occupies the area proximate to the spring end "3–4" shift valve 33 as the "3–4" T.V. modulator valve opens. The resulting drop in pressure allows governor pressure acting on the larger diameter land (0.620 inches) of the "3–4" shift valve 33 to upshift the transmission to 4th gear at higher vehicle speeds regardless of throttle opening. Accordingly, 4th gear can be selected manually at higher vehicle speeds at wide open throttle conditions, as a result of the modifications to the hydraulic circuitry of the "factory installed" AOD transmission in accordance with the present invention.

A further object of the modification to the hydraulic circuitry of the "factory installed" AOD transmission is to increase the 3rd clutch capacity at high throttle during a "2–3" shift to insure the durability of the 3rd clutches. This object is accomplished by adding to the "factory installed" hydraulic circuitry, a passage or tube designated by reference numeral 36 as illustrated in FIGS. 1, 2, 3, and 4. Passage 36 is provided to couple the new manual valve 30 with a pre-existing "factory installed" oil pressure booster valve designated by reference numeral 37. Passage 36 is an external tube through which a pressure boost is supplied in the 1st, 2nd and 3rd gear, allowing higher pressure for high throttle "2–3" shifts. A passageway 39 in the "factory installed") hydraulic circuit is blocked at the area designated by reference numeral 38 in FIGS. 1, 2, 3, and 4 of the drawing. Pre-existing passageway 39 is blocked to prevent exhausting of the new added passageway (pressure boost 36). Maximum line pressure in 3rd gear resulting from the addition of new passageway 36 and the blocking of pre-existing passageway 39 exceeds 200 psi. This is compared to maximum line pressure in 3rd gear of 150 psi in the hydraulic circuit of the "factory installed" AOD transmission.

A further object of the present invention is to modify the "factory installed" AOD transmission to improve the firmness and timing of the shifts. This object is accomplished by increasing minimum and maximum main line pressure by adjusting the inner and outer pressure regulator springs, and by providing a pressure boost in 3rd gear, both of these aspects of the present invention having ben previously discussed herein. Additionally, orifices present in the "factory installed" AOD transmission are enlarged or reduced for selectively increasing or decreasing the quantity and rate of fluid flow therethrough. Preferably, the following adjustments are made to orifice diameters:

1. Orifice 40, in a line coupled to the "1–2" accumulator, is enlarged from a "factory installed" diameter of 0.055 inches to a diameter of 0.062 inches. (See FIGS. 1, 2, 3, and 4);
2. Orifice 41, in a line coupled to the "2–3" backout valve, is enlarged from a "factory installed" diameter of 0.042 inches to a diameter of 0.055 inches (See FIGS. 1, 2, 3, and 4);
3. Orifice 42, also in a line coupled to the "2–3" backout valve, is reduced from a "factory installed" diameter of 0.042 inches to a diameter of 0.030 inches (See FIGS. 1, 2, 3, and 4);
4. Orifice 43, in a line coupling the "2–3" backout valve with the direct clutch, is enlarged from a "factory installed" diameter of 0.052 inches to a diameter of 0.055 inches (See FIGS. 1, 2, 3, and 4);
5. Orifice 44, also in a line coupling the "2–3" backout valve to the direct clutch, is enlarged from the "factory installed" diameter of 0.053 inches to a diameter of 0.063 inches (See FIGS. 1, 2, 3, and 4);
6. Orifice 45, in a line coupling the new manual valve 30 with the "1–3" shift valve and the "1–2" accumulator valve, is enlarged from a "factory installed" diameter of 0.101 inches to a diameter of 0.125 inches. (See FIGS. 1, 2, 3 and 4); and
7. Orifice 46, in a line coupled to the new "3–4" valve 33, is enlarged from a "factory installed" diameter of 0.076 inches to a diameter of 0.125 inches. (See FIGS. 1, 2, 3 and 4).

In accordance with the above disclosure, the present invention modifies the hydraulic circuitry of a "factory installed" AOD transmission installed in vehicles produced by the FORD Motor Company to improve the overall performance thereof. The improvements include adjustments to permit manually holding first gear to any engine speed, selecting 4th gear manually at relatively high vehicle speed at wide open throttle, increasing the 3rd clutch capacity at high throttle during a "2–3" upshift, and generally improving the firmness and timing of shifting by the transmission. The improvements result from modifications including replacement of regulator springs to increase minimum and maximum main line pressure, providing new fluid flow passageways and deleting existing fluid flow passageways to increase maximum main line pressure, replacement of valves of the "factory installed" transmission, and increasing and decreasing the size of orifices of the "factory installed" transmission to increase and decrease the rate and quantity of fluid flow through selected portions of the hydraulic circuitry.

Other modifications and improvements within the scope of the invention will become apparent to those skilled in the relevant art. Accordingly, the discussion of the preferred embodiments of the invention herein has been intended to be illustrative only, and not restrictive of the scope of the invention, that scope being defined by the following claims and all equivalents thereto.

I claim:

1. A method of modifying hydraulic circuitry of an original Automatic Overdrive (AOD) automotive transmission of the type including a manual valve coupled in fluid flow relationship with a release side of an overdrive servo, said method including the step of:

modifying said manual valve by defining an additional land thereon, said additional land being defined on said manual valve such that said additional land is positioned, during a manual "1–2" shift, over an exhaust passageway coupled in fluid flow relationship to said release side of said overdrive servo.

2. The method as claimed in claim 1, further including the step of defining an orifice in said additional land of said manual valve for restricting said exhaust passageway to delay a drop in fluid pressure on the release side of said overdrive servo to decrease an apply rate of an overdrive band.

3. The method as claimed in claim 2, wherein said orifice is defined in said additional land by cross-drilling said orifice at a size of substantially 0.042 inches in diameter.

4. The method as claimed in claim 1, further including the step of increasing maximum line pressure in said hydraulic circuit of said original AOD transmission.

5. The method as claimed in claim 4, wherein said maximum line pressure is increased by the step of replacing inner and outer pressure regulator springs of said original AOD transmission with replacement inner and outer regulator springs having spring characteristics selected to increase said maximum line pressure by modifying resilient forces applied to a pressure regulator valve by said replacement inner and out regulator springs.

6. The method as claimed in claim 1, further including the step of modifying a 1-2 capacity modulator valve in said original AOD transmission coupled to a 1-2 capacity modulator valve with a plurality of lands having dimensions selected to improve calibration of a 1-2 shift.

7. The method as claimed in claim 6, further including the steps of defining said plurality of lands such that said modified 1-2 capacity modulator valve is receivable within a bore defined in a valve body of said original AOD transmission to define an annular opening between said modified 1-2 capacity modulator valve and said bore in said valve body for stabilizing modulating activity performed by said 1-2 capacity modulator valve and for preventing said 1-2 capacity modulator valve from sticking in said bore in said valve body.

8. The method as claimed in claim 6, further including the step of modifying said 1-2 capacity modulator valve of said original AOD transmission to increase the depth of a bore defined in said 1-2 capacity modulator valve for receiving a spring therein.

9. The method as claimed in claim 8, further including the step of increasing said depth of said bore in said 1-2 capacity modulator valve such that a low rate spring is receivable within said bore.

10. A method of modifying hydraulic circuitry of an original Automatic Overdrive (AOD) transmission of the type including a manual valve, a 1-2 capacity modulator valve, and inner and outer pressure regulator springs; said method enabling said original AOD transmission to hold 1st gear in the 1st gear selector position of a gear selector of said original AOD transmission at any engine speed and not limited to engine speeds not exceeding 4500 rpms; the steps of said method including:

adjusting said inner and outer pressure regulator springs to increase maximum line pressure in said hydraulic circuit to adjust resilient forces applied thereby to a pressure regulator valve, and modifying said manual valve to define an additional land having an orifice therein, said additional land on said manual valve being oriented relative to said hydraulic circuit such that said additional land is, during a 1-2 shift, positioned over an exhaust passageway coupled in fluid flow relationship to a release side on an overdrive servo for delaying a drop in fluid pressure on said release side of said overdrive servo for decreasing an apply rate of an overdrive band of said AOD transmission.

11. A method of modifying hydraulic circuitry of an original Automatic Overdrive (AOD) automotive transmission of the type including a 3-4 shift valve coupled in fluid flow relationship to a governor, said method including the step of:

modifying said 3-4 shift valve to increase the diameter of an arcuate configured land on said valve on which fluid pressure from said governor is applied, for enabling said modified 3-4 shift valve to shift at less applied governor fluid pressure that required to shift said 3-4 shift valve of said original AOD transmission, wherein said modified hydraulic circuit enables an upshift of said AOD transmission to 4th gear at wide open throttle condition.

12. The method as claimed in claim 11, wherein the diameter of said land is increased to substantially 0.620 inches.

13. The method as claimed in claim 11, further including the step of limiting fluid pressure applied by said governor to said 3-4 shift valve by installing a governor limiting valve operatively associated with said 3-4 shift valve to limit fluid pressure applied by said governor on said increased diameter land to a predetermined maximum applied value of fluid pressure.

14. The method as claimed in claim 13, further including the step of defining an orifice in a line coupling said governor and said 3-4 shift valve in fluid flow relationship, the size of said orifice being selected to reduce fluid flow to said 3-4 shift valve for reducing the quantity of fluid exhausted by said governor limiting valve operatively associated with said 3-4 shift valve.

15. The method as claimed in claim 14, wherein the size of said orifice defined in said line coupling said governor to said 3-4 shift valve is substantially 0.086 inches in diameter.

16. The method as claimed in claim 13, further including the step of controlling said governor limiting valve to limit said maximum fluid pressure applied from said governor to said 3-4 shift valve to not exceed 140 psi for preventing said AOD transmission from upshifting to 4th gear when a gear selector of said AOD transmission is in a 3rd gear selection position.

17. A method of modifying hydraulic circuitry of an original Automatic Overdrive (AOD) automotive transmission of the type including a manual valve, an oil pressure booster valve, and a 2-3 shift valve coupled in fluid flow relationship to said oil pressure booster valve; the steps of said method including:

providing a fluid flow passageway for coupling said manual valve to said oil pressure booster valve, and blocking a passageway coupling said 2-3 shift valve to said oil pressure booster valve.

18. The method as claimed in claim 17 wherein maximum line pressure is increased in 3rd gear to exceed 200 psi.

19. The method as claimed in claim 17 wherein a power boost is provided in 3rd gear by said step of coupling said manual valve to said oil pressure booster valve, and exhausting said power boost in 3rd gear is prevented by said step of blocking said passageway coupling said 2-3 shift valve to said oil pressure booster valve.

* * * * *

UNITED STATES PATENT AND TRADEMARK OFFICE
CERTIFICATE OF CORRECTION

PATENT NO. : 5,730,685
DATED : March 24, 1998
INVENTOR(S) : Gilbert W. Younger

It is certified that error appears in the above-identified patent and that said Letters Patent is hereby corrected as shown below:

Claim 5, Line 8 (Column 11, Line 11): Delete "out" and substitute - -outer- -.

Claim 6, Line 3 (Column 11, Line 14): After "a", add - - 1-2 accumulator valve by providing said original- -.

Claim 10, Line 19 (Column 11, Line 54): Delete "on" and substitute - -of- -.

Claim 11, Line 10 (Column 12, Line 8): Delete "that" and substitute - -than- -.

Signed and Sealed this

Ninth Day of June, 1998

Attest:

BRUCE LEHMAN

Attesting Officer

Commissioner of Patents and Trademarks